United States Patent [19]

La Marche et al.

[11] 3,823,275

[45] July 9, 1974

[54] COMMON CONTROL DIGITAL ECHO SUPPRESSOR

[75] Inventors: Robert Ernest La Marche, Atlantic Highlands; Carl Jerome May, Jr., Holmdel, both of N.J.

[73] Assignee: Bell Telephone Laboratories Incorporated, Murray Hill, N.J.

[22] Filed: Aug. 10, 1972

[21] Appl. No.: 279,710

[52] U.S. Cl. .......................... 179/170.2, 179/170.6

[51] Int. Cl. .......................................... H04b 3/20

[58] Field of Search............ 179/170.2, 170.6, 170.8

[56] References Cited

UNITED STATES PATENTS

| | | | |
|---|---|---|---|
| 3,206,559 | 9/1965 | Barney | 179/170.6 |
| 3,275,759 | 9/1966 | Brady | 179/170.6 |
| 3,562,448 | 2/1971 | May | 179/170.6 |
| 3,673,355 | 6/1972 | La Marche | 179/170.6 |

FOREIGN PATENTS OR APPLICATIONS

| | | | |
|---|---|---|---|
| 21,966 | 8/1966 | Japan | 179/170.2 |

*Primary Examiner*—Kathleen H. Claffy
*Assistant Examiner*—Alan Faber
*Attorney, Agent, or Firm*—W. L. Keefauver

[57] ABSTRACT

A full echo suppressor having all of its control circuitry located at a near end of a plurality of two-way transmission paths is disclosed. Analogue signal levels on each line of each associated transmit-receive line pair are periodically converted into pcm codes and applied to a plurality of threshold detectors in a time slot for that line pair. Echo suppression is provided for echoes resulting from signal transmissions from the near end when common control circuitry determines, from information obtained from the threshold detectors, that a receive line is currently idle and the associated transmit line was active a selected interval of time in the past. Echo suppression is provided for echoes resulting from signal transmissions from the distant end when common control circuitry determines, from information obtained from the threshold detectors, that a transmit line is currently idle and the associated receive line is currently active.

5 Claims, 8 Drawing Figures

COMMON CONTROL DIGITAL ECHO SUPPRESSOR

BACKGROUND OF THE INVENTION

1. Field of the Invention

This invention relates to echo suppressors for two-way transmission systems and, more specifically, to full echo suppressors for such systems.

2. Description of the Prior Art

Echo suppressors are primarily signal controlled devices which insert a large attenuation in the echo path of a two-way transmission system while signals are being transmitted over the other path. In general, an echo suppressor detects a signal being transmitted and responds by inserting an attenuator in series with the line which is the return path for a resultant echo to suppress that echo. The removal of the attenuator upon the occurrence of a null in the transmission is delayed a selected interval, called hangover, in order to accommodate signals of varying amplitude. This delayed removal is provided to insure that the attenuation is not removed from the echo path when the received signal merely drops below the activation threshold temporarily.

A full echo suppressor uses circuitry located at only one end, called the near end, of a two-way transmission system and provides suppression of echoes resulting from transmissions from both the near end and the other end, called the distant end. Since all of the suppression circuitry in a full echo suppressor is located at only one end, such an echo suppressor can only detect the presence of signals at the near end and also it can only insert attenuation at the near end. Thus, prior art full echo suppressors have operated by inserting the attenuation into an echo return line at the time a signal transmission which will cause an echo is detected on a transmit line, assuming the echo return line is not carrying a signal transmission from the distant end.

By having all attenuation, detection and control circuitry in one location, a full echo suppressor reduces the amount of circuitry required since such circuitry can be shared. However, certain problems result from the location of the echo suppression circuitry at one end of the two-way transmission system. The transmission distance between the two ends of the transmission system causes a time delay, dependent upon the length of the transmission path, between the detection of a signal transmission from the near end and the return to the near end of an echo resulting from such a transmission. This time delay is called the round trip delay.

With respect to signal transmissions from the near end of a long two-way transmission path this time delay results in the return of an echo to the near end long after the transmission from the near end which caused it was detected by the detection circuitry. Thus, the attenuation, which is controlled by the current signal level detected on the lines, might be inserted when a signal transmission from the near end is detected but removed before the echo resulting from that transmission has returned to the near end. This results in the insertion of attenuation when it is not needed and the removal of the attenuation before it is needed.

To minimize this problem, prior art full echo suppressors have extended the hangover time controlling the removal of the attenuator which surrpesses echoes resulting from transmissions from the near end. Thus, the attenuation is inserted when a signal transmission is detected but it is removed only after the extended hangover time period, following the termination of the original transmission, has passed. When operating in this manner, the attenuator is still present in the echo return path when the echo returns. Such extended hangover echo suppressors perform adequately for transmission systems where the round trip transmission delay is less than approximately 50 milliseconds. However, for circuits having longer round trip time delays, conversation on such an extended hangover full echo suppressor is impaired.

SUMMARY OF THE INVENTION

The full echo suppressor of the applicants' invention provides echo suppression for two-way transmission systems having a round trip transmission time delay which can greatly exceed 50 milliseconds without degradation in service. In accordance with the applicants' invention, the decision to insert or remove attenuation from an echo return line, is based on the signal amplitude level detected on an associated transmit line, but such decision is made at the time that the effect of such a signal amplitude level occurs at the associated attenuator and not at the time such signal amplitude level occurs on the transmit line. By operating in this manner, closer control is maintained over the attenuator and the need for the extended hangover of the prior art is avoided.

To provide echo suppression in accordance with the applicants' invention, the signal level occurring on a near end transmit line is detected and a code representing this signal level is stored in a delay unit. At approximately the time the effect of this stored signal level will occur at the attenuation point, common control circuitry reads both the stored signal level from the delay unit and the signal level presently occurring on the receive line which is the echo return line associated with the transmit line. On the basis of the present signal level on this receive line and the stored signal level, which represents the signal level on the transmit line a selected interval of time in the past, the common control circuitry determines if attenuation should be inserted into the receive line. Attenuation is inserted into the receive line when the near end transmit line was active the selected interval of time in the past and the near end receive line is presently idle.

Echo suppression is provided for echoes resulting from transmissions from the distant end in substantially the same manner as it is provided for echoes resulting from transmissions from the near end. However, when the echo suppression circuitry is located at the near end, which is the present case, the delay time between the detection of a transmission from the distant end and the point of attenuation for its resultant echo is so small that the compensating delay time is presumed to be zero. Therefore, the common control circuitry responds to the current signal levels on both the transmit and receive lines and attenuation is inserted into the near end transmit line when it is idle and the near end receive line is active.

GENERAL DESCRIPTION

Figure 1:
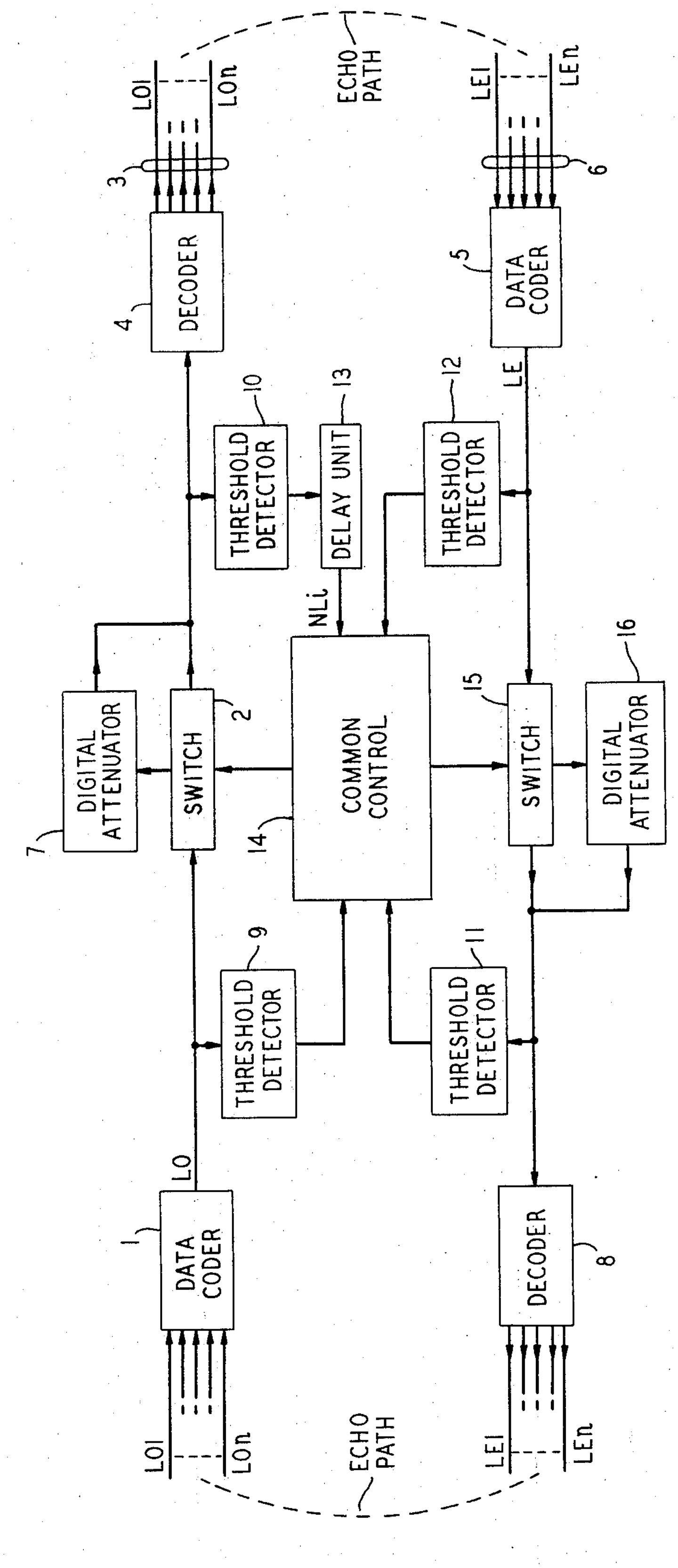
FIG. 1 shows a general functional block diagram of a two-terminal communication system incorporating the applicants' invention as a full echo suppressor.

A functional block diagram of a two-way transmission system utilizing the applicants' invention is shown in the FIG. 1. At the near end of this transmission system, a data coder 1 repetitively samples the analogue signal levels on the lines LO*l* through LO*n*, called the odd lines, and generates a pulse code representing the sampled amplitude on each line in a time slot for that line. This pulse code is applied via the line LO to threshold detectors 9 and 10 for the control of the echo suppressor and to a decoder 4 for transmitting the information to the distant end. The decoder 4 decodes each pulse code representation on the line LO into analogue signals which are applied to the appropriate transmission lines LO*l* through LO*n* of the conductor group 3. These analogue signals are transmitted to the distant end terminal via the conductor group 3.

Signals from the distant end terminal are transmitted in analogue form via the leads LE*l* through LE*n* of a conductor group 6 to a data coder 5 which is located at the near end. For the purposes of this discussion, it will be assumed that the input line LO*i* to the near end data coder 1 is associated with the line LE*i* of the conductor group 6 to form a complete two-way transmission path. In this case, the pulse code generated by the data coder 5 resulting from a sample of the lead LE*i* will be generated during the same slot as the code signals resulting from the sampling of the line LO*i* by the data coder 1. When no echo suppression is activated, the pulse code outputs of the data coder 5 are applied via the line LE to the threshold detectors 11 and 12 for purposes of echo suppression control and to a decoder 8 which converts the pulse codes back to analogue form and applies these analogue signals to the leads LE*l* through LE*n*.

The pulse code signals on the lines LO and LE are applied to the threshold detectors 9, 10, 11, and 12 to provide the echo suppressor common control circuitry 14 with information concerning the amplitude levels of signals on the lines LO*l* through LO*n* and LE*l* through LE*n*. The signals applied to the threshold detectors 10 and 12 are utilized to control the suppression of echoles resulting from signal transmissions from the near end on the lines LO*l* through LO*n* and the signals applied to the threshold detectors 9 and 11 are utilized to control echo suppression for signal transmissions from the distant end on the lines LE*l* through LE*n*. The immediately following discussion concerns the control of echo suppression for signals transmitted from the near end. It will be assumed that the near end input line LO*l* is associated with the distant end line LE*l* and, since the principles of time sharing are well known, the discussion will center around this single line pair LO*l* – LE*l*.

The threshold detector 10 responds to the pulse code representing the signals on the line LO*l*, during each common control time slot for the line pair LO*l* – LE*l*, by generating an amplitude level code approximating the peak value of the signal on the line LO*l* since the last common control time slot for that line. Each amplitude level code generated by the threshold detector 10 for the line LO*l* is applied to a delay unit 13 where it is temporarily stored. The threshold detector 12, during each common control time slot for the line pair LO*l* – LE*l*, generates the amplitude level code for the line LE*l*. Also during each common control time slot for the line pair LO*l* – LE*l* the common control 14 receives from the delay unit 13 an amplitude level code NL*i* representing the signal level which occurred on the line LO*l* a selected interval of time $\Delta T$ prior to the current time slot and it receives from the threshold detector 12 the amplitude level code representing the present signal level on the line LE*l*. The selected time interval $\Delta T$ is approximately equal to the time between the detection, by the threshold detector 10, of a transmission from the near end and the return to the near end of an echo resulting from that transmission.

The common control circuitry 14 then determines from the current amplitude level code for the line LE*l* if the line is idle or active and it determines from the delayed amplitude level code NL*i* for the line LO*l* if this line was idle or active the period of time $\Delta T$ in the past. When the line LO*l* was active during the common control time slot which occurred the period of time $\Delta T$ in the past and the line LE*l* is currently idle, an echo suppressor control signal is generated by the common control circuitry 14. The switch 15 responds to this control signal by inserting an attenuator 16 into the conductor LE during the time slot for the line pair LE*l* – *LOl.*

Figure 2:
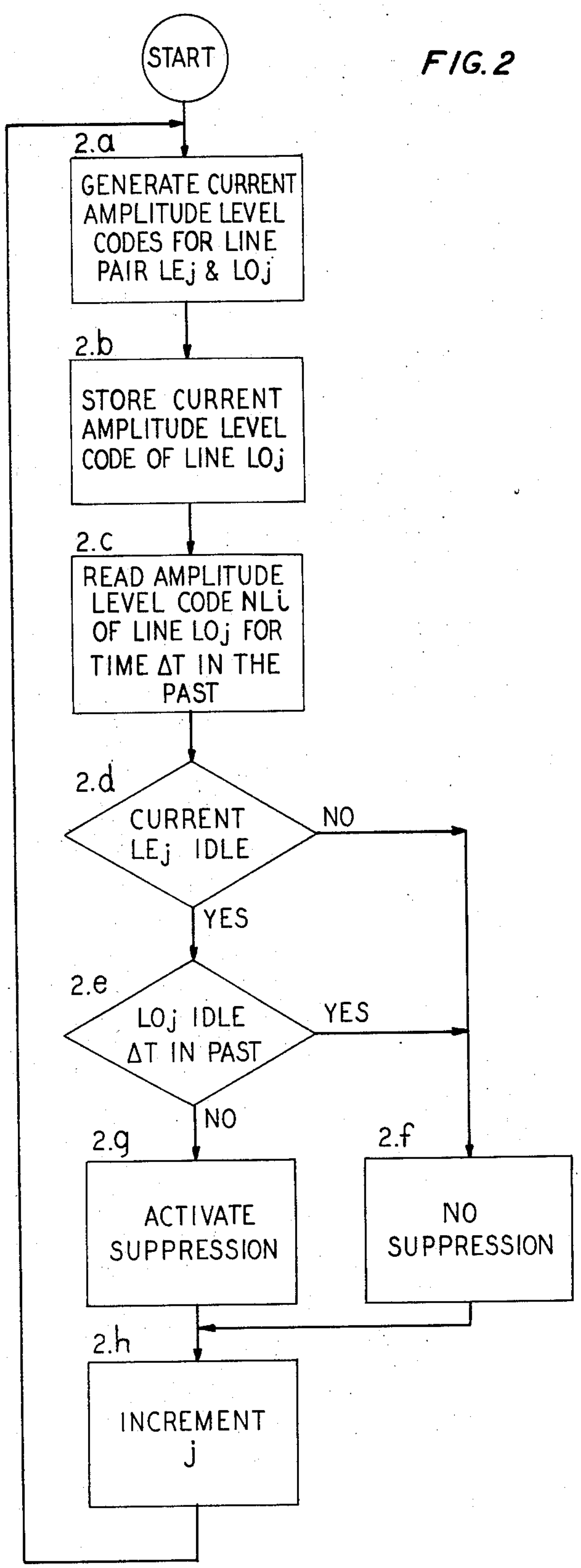
FIG. 2 is a state diagram which is useful in describing the operation of the system shown in FIG. 1.

The above described echo suppression operations are most readily understood when discussed in terms of the general flow diagram shown in the FIG. 2. The symbols $LE_j$ and $LO_j$ are used in this figure to represent the even and the odd lines in the line pair associated with the current time slot. For instance, when the time slot for the signals of the line pair LE*l* – LO*l* is occurring, the $LE_j$ and $LO_j$ in the FIG. 2 represent these lines. When a line pair LE*l* – LO*l* time slot occurs, the step 2.a is first performed during which the threshold detector 10 (FIG. 1) produces the current amplitude level code for the line LO*l* and the threshold detector 12 (FIG. 1) generates the current amplitude level code for the line LE*l*. In the next steps 2.*b* and 2.*c*, the amplitude level code generated for the line LO*l* during the current time slot is stored in the delay unit 13 (FIG. 1) and the amplitude level code which was generated for the line LO*l* the period of time $\Delta T$ previously is read from the delay unit 13 (FIG. 1).

The next step 2.*d*, which is taken by the common control circuitry 14 (FIG. 1), is to determine if the line LE*l* is currently idle, that is, to determine if the line LE*l* is being used to transmit information from the distant end during the present time slot. If the line LE*l* is idle, then an attenuator may be inserted in series with the line LE during the LO*l* – LE*l* time slot without interrupting the transmission of information. Assuming that the line LE*l* is idle, the next step 2.*e* is to determine if the line LO*l* was idle the period of time $\Delta T$ in the past. In this case, the line LO*l* is considered idle if no information was being transmitted on that line. If the output of the delay unit 13 (FIG. 1) indicates that the line LO*l* was idle, there is no need to activate echo suppression since no echo will be returning. However, if the output of the delay unit 13 (FIG. 1) indicates that the line LO*l* was active, the possibility exists that an echo signal is returning over the echo path LE*l* and a step 2.*g* is performed to activate suppression during this time slot.

It will be noted that if during the step 2.*d* (FIG. 2) it is determined that the line LE*l* is not idle, the next step 2.*f* is to inhibit the activation of echo suppression. The indication that the line LE*l* is not idle means that signals on it may not be attenuated without destroying information being transmitted. Consequently, when the line LE*l* is not idle, no echo suppression is activated and if echo suppression was previously activated due to past samples of the line pair, it is deactivated.

After completing the foregoing steps for the first line pair LE*l* – LO*l*, the steps are repeated for the next line pair. This process will continue until each of the signals on each of the line pairs in an *n* pair system has been processed and then the process will begin again with the first line pair.

Echo suppression is provided for signal transmissions from the distant end on the basis of the amplitude level codes generated by the threshold detectors 9 and 11 (FIG. 1). In the following description, it will again be assumed that the lines LE*l* and LO*l* form a two-way transmission path. The amplitude level codes generated by the threshold detectors 9 and 11 (FIG. 1) represent the current signal levels occurring on the lines LO*l* and LE*l*, respectively. Both of these amplitude level codes are applied directly to the common control 14 (FIG. 1) without any delay. No delay is provided since the period of time between the detection of a signal by the threshold detector 11 and the return of the resultant echo to an odd line attenuator 7 (FIG. 1) is approximately zero. Therefore, the common control circuitry 14 (FIG. 1) operates on the basis of the current amplitude codes for each line. When the line LO*l* is determined to be idle and the line LE*l* is determined to be active, the common control circuitry 14 (FIG. 1) generates an echo suppression enable signal. In response to this signal, the switch 2 (FIG. 1) inserts an attenuator 7 (FIG. 1) into the line LO to block echoes resulting from the transmission received on the line LE*l*.

Figure 8:
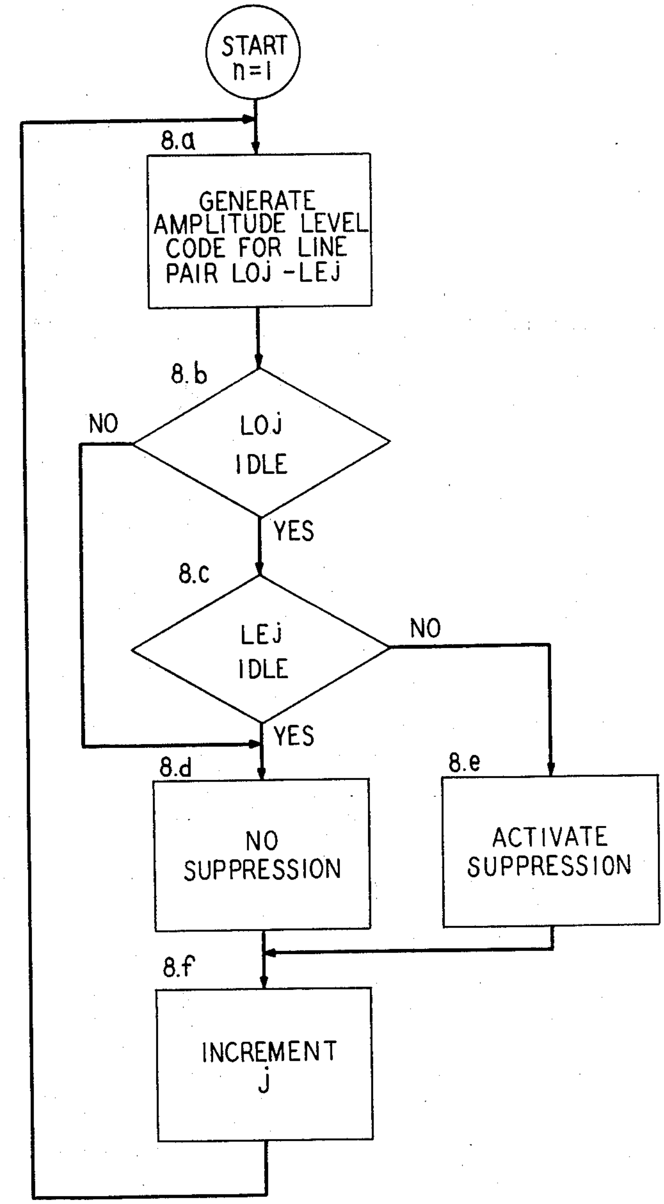
FIG. 8 is a state diagram which is useful in describing the operation of FIG. 1.

A general flow diagram of the control of echo suppression for signals transmitted from the distant end is shown in FIG. 8. This control is essentially the same as that described with reference to FIG. 2 except that neither of the amplitude level codes generated by the threshold detectors 9 or 11 is delayed. This delay is not required for controlling echo suppression for transmissions from the distant end since, as previously stated, the time between the detection of such a transmission and the point of attenuation for a resultant echo is so small that it is presumed to be zero. To provide echo suppression for signal transmissions from the distant end, a first step 8.*a* is performed for generating the amplitude level code for each of the lines LE*l* and LO*l*. Next, a step 8.*b* is performed to determine if the line LO*l* is currently idle, that is, to determine if the line LO*l* is being used to transmit information. If the line LO*l* is idle, then an attenuator may be inserted in series with the line LO during the time slot for the LO*l* – LE*l* line pair without interrupting the transmission of information. Assuming that the line LO*l* is idle, the next step 8.*c* is to determine if the line LE*l* is currently idle. In this case, the line LE*l* is idle if no information is being transmitted on that line. If the line LE*l* is idle, there is no need to activate echo suppression since no echo will be returning. However, if the line LE*l* is active, this indicates the possibility of an echo returning over the line LO*l* and a step 8.*e* is performed to activate suppression during this time slot. When suppression is activated, the common control 14 (FIG. 1) generates the echo suppression enable signal to which the switch 2 (FIG. 1) responds by inserting the digital attenuator 7 (FIG. 1) in series with the ine LO during the line pair LO*l* – LE*l* time slot.

It will be noted that if during the step 8.*b l* (FIG. 8) it is determined that the line LO*l* is not idle, the next step 8.*d* is to inhibit the activation of echo suppression. The indication that the line LO*l* is not idle means that the signals on it may not be attenuated without destroying the information being transmitted. Consequently, when the line LO*l* is not idle, no echo suppression is activated and if echo suppression was previously activated it is not deactivated.

In essence, with the applicants' full echo suppressor, the decision to insert or remove attenuation in the line LE is based on the signal amplitude levels on associated lines LO*i* and LE*i* but such a decision is made at the time when the effect of a given amplitude level on the line LO will occur at the point of attenuation in the line LE. The time for this decision is controlled by delaying the sampled amplitude levels from the line LO for a period of time $\Delta T$ which is approximately equal to the system round trip delay time. A common control 14 then determines from the amplitude level which occurred on line LO the period of time $\Delta T$ in the past and the current amplitude level on the line LE if attenuation is necessary. Attenuation is inserted into the line LE when the line LO*i* was active the period of time $\Delta T$ in the past and the line LE*i* is currently idle.

The common control 14 determines if attenuation should be inserted into the line LO, to block echoes resulting from transmissions from the distant end, on the basis of the current amplitude level signals on the lines LO*i* and LE*i*. This decision is based on the current amplitude level signals since the time delay between the detection of a transmission from the distant end and the return of a resulting echo to the point of attenuation in the line LE is presumed to be zero and no compensating delay time is required. Attenuation is inserted into the line LO when the line LE*i* is currently active and the line LO*i* is currently idle.

DETAILED DESCRIPTION

Figure 3:
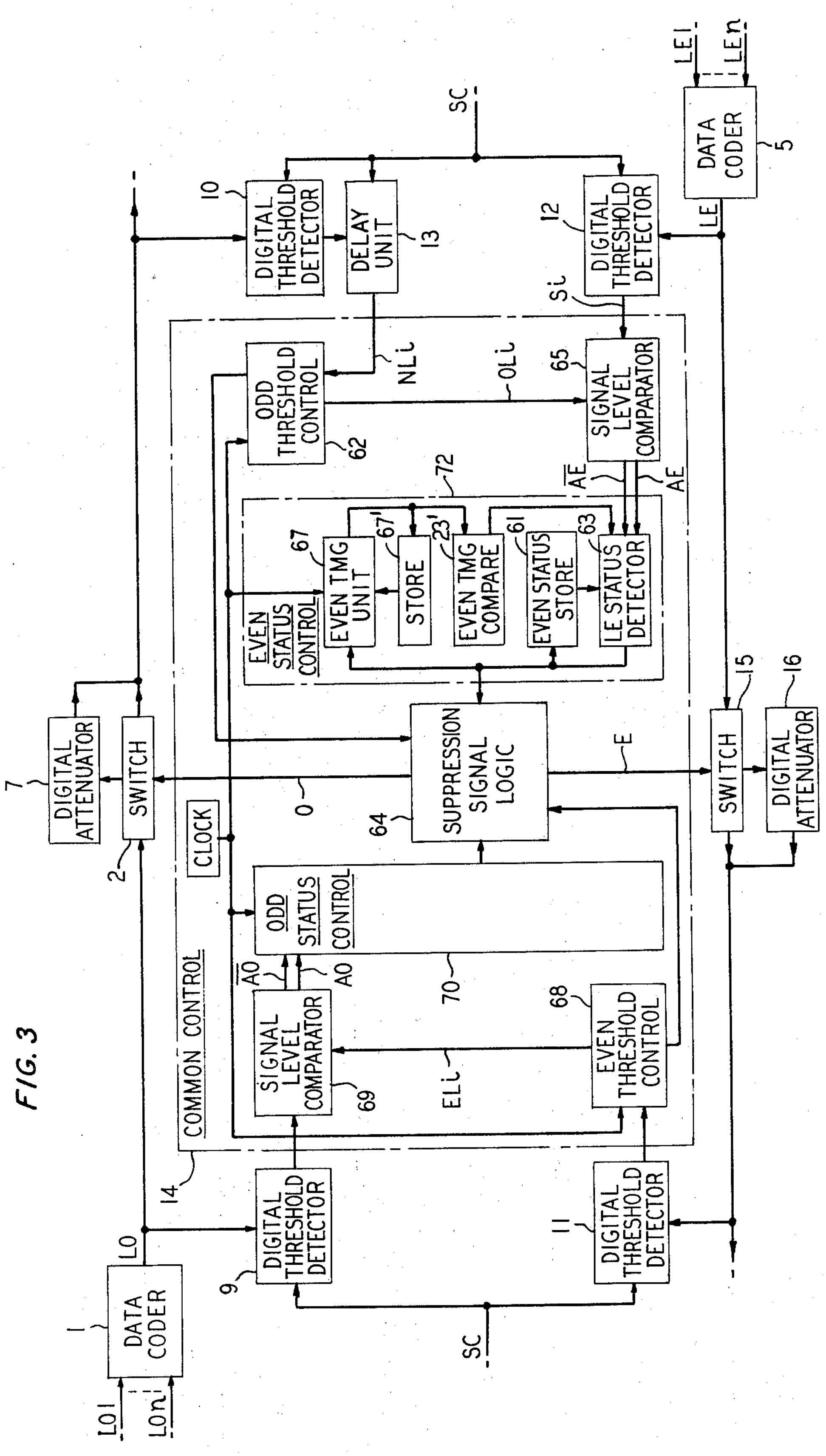
FIG. 3 is a functional block diagram of a full echo suppressor system that provides echo suppression.

A system operating in the manner generally described above is shown in the FIG. 3. The circuitry shown in the FIG. 3 is located at the near end of a two-way transmission system. While the system is intended to service a plurality of line pairs, its operation may be completely and clearly described, with a minimum of repetition, using only one pair of lines.

FIG. 3 shows lines LO*l* through LO*n* connected to a data coder 1. This coder 1 repetitively samples these lines and generates a pulse code representing the signal amplitude on each line as the line is sampled. The bits comprising the pulse code are transmitted from the output of the coder 1 over line LO and are applied to the digital threshold detector 9, a switch 2 and, when echo suppression is not activated, to the digital threshold detector 10. The path just described will be referred to as the transmitting path and the lines LO*l* through LO*n* will be referred to as the transmitting lines. The data coder 1 may, for example, be any one of numerous well-known pcm coders. The lines LE*l* through LE*n* (FIG. 3) are the lines over which analogue signals are transmitted from the distant terminal. A data coder 5 (FIG. 3) repetitively samples these lines and generates a pulse code, representing the signal amplitude on each line as the line is sampled, during a time slot for each line. The data coder 5 in this example generates the pulse code representing the line LE*l* during the same time slot that the data coder 1 generates the pulse code for the line LO *l*. It will be noted that the pulse code signals generated by the data coder 5 are transmitted on the line LE (FIG. 3) to the digital threshold detector 12, the switch 15 and, when echo suppression is not activated, the digital threshold detector 11 (FIG. 3). This path will be referred to as the receiving path and the lines LE*l* through LE*n* will be referred to as the receiving lines.

The digital threshold detectors 9 and 10 in FIG. 3 are used to convert the pcm encoded peak amplitude of the signals sampled on a line LO*i* into a four-bit amplitude code in the time slot for that line. The threshold detectors 9 and 10 have two functions. The first is to approximate, from the pulse codes appearing on the line LO, the peak value of the signal envelope on a line LO*i* during the interval between common control time slot occurrences for line LO*i*. In essence, this approximation compresses a pcm code group consisting of, for example, eight bits into a four-bit code that can represent 16 discrete signal levels in an amplitude range that is meaningful in supplying echo suppression. The second function of the threshold detectors is to use this approximation to generate amplitude codes during the common control time slot for line LO*i*. The operation of threshold detectors 11 and 12 is the same as the operation of the threshold detectors 9 and 10 except that the former detectors serve pcm codes on the line LE generated from signals appearing on the LE*l* through LE*n* lines.

A detailed description of a similar threshold detector is disclosed in the copending application of C. J. May, Jr., Ser. No. 69,752, filed Sept. 4, 1970, now U.S. Pat. No. 3,706,091, and the R. E. La Marche et al. U.S. Pat. No. 3,673,355 issued June 27, 1972. The following is a summary of the operation of this threshold detector. The pcm codes representing samples of the signal levels on a given line LO*i* occur at some multiple of the rate that the common control time slot occurs for the line. For example, *r* codes representing *r* samples of a line LO*i* may appear on line LO for each occurrence of the common control time slot for LO*i*. When the first of the *r* codes generated between common control time slots for the line LO*i* occurs, its absolute value is compared with a stored code representing past codes generated on line LO*i*. The common control time slots are identified by the application of timing pulses SC (FIG. 3) that are synchronized with the common control timing and applied to the threshold detectors. If the absolute value of the new code represents a signal level within the range of amplitudes capable of producing echoes and the code is greater than the stored code, the absolute value of the new code replaces the stored code. This reflects the increase in the magnitude of the envelope amplitude of a signal capable of producing echoes. This same operation will be repeated for the remaining *r*-1 codes generated by the signals on line LO*i*, if each successive code represents an envelope amplitude having a greater magnitude than that represented by the preceding codes.

In other words, if the magnitude of the signal envelope being sampled and encoded on line LO*i* continuously increases in the interval under discussion, the LO*i* code stored in the threshold detector will be changed on each sample of the envelope to reflect this increase. On the other hand, if the magnitude of the envelope amplitude has decreased from what it had previously been, the absolute value of the lower value code occurring after the decrease has continuously existed for every sample of the line for a selected interval will replace the stored code. This operation reflects the decrease in the magnitude of the signal peak amplitude.

The foregoing operation will be repeated until the decreasing signal amplitude drops and remains below the lowest amplitude of the selected range of amplitudes being encoded. This latter condition is represented by a zero code output from the detector. When the common control time slot SC for line LO*i* occurs, the amplitude code associated with it in the threshold detector is available at the output of the threshold detector.

Figures 4, 5, 6:
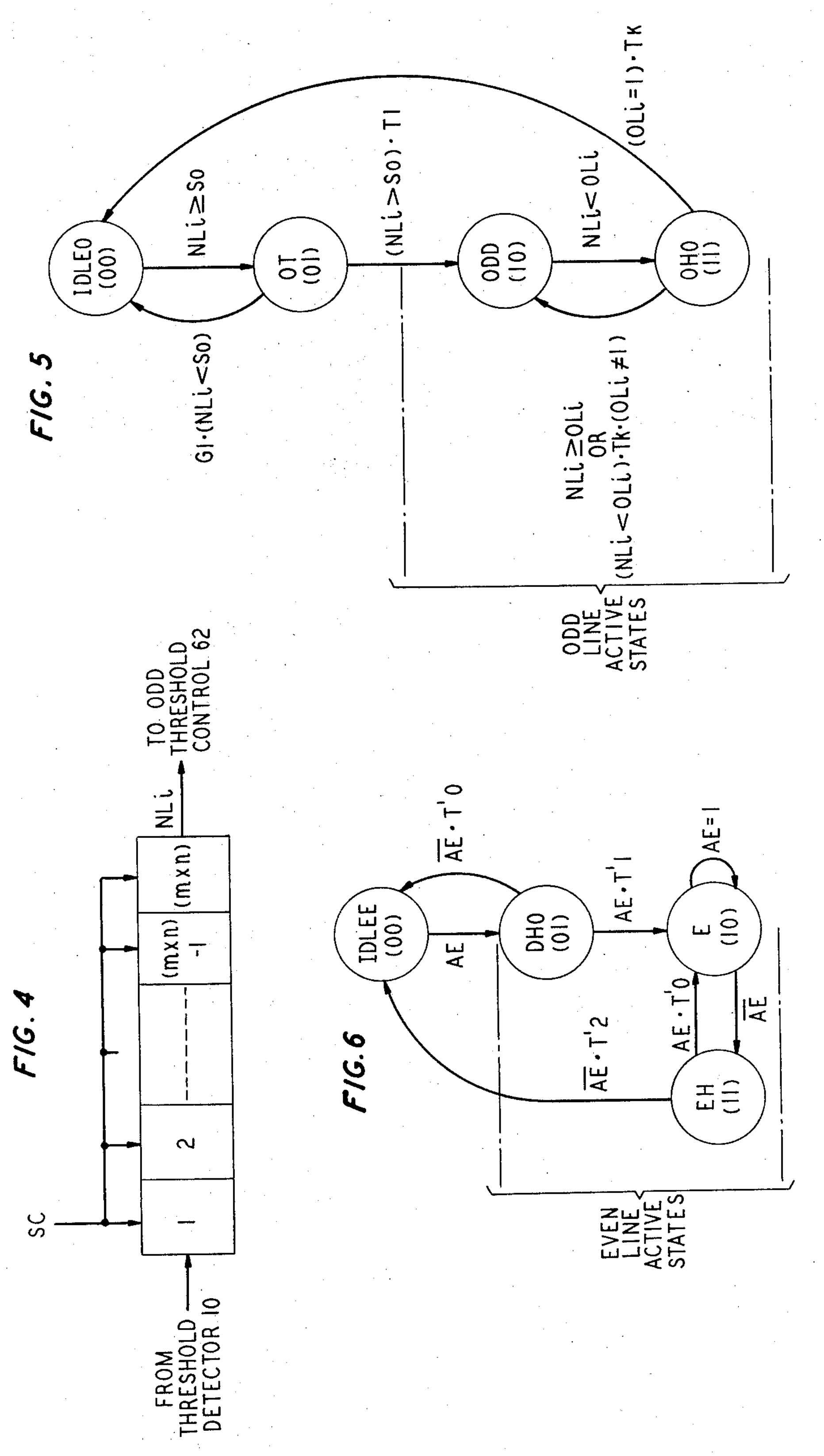
FIG. 4 is an example of the delay unit shown in FIG. 3.
FIGS. 5 and 6 are state diagrams useful in describing the operation of the system shown in FIGS. 3 and 7.

The amplitude codes present at the output of the threshold detector 10 are applied to a delay unit 13 (FIG. 3) which is shown in greater detail in the FIG. 4. In the embodiment shown in the FIG. 4, the delay unit 13 is a shift register which is comprised of a number of storage cells *l* through $m \times n$. Each storage cell stores a four-bit amplitude code from the threshold detector 10. Each common control timing pulse SC causes the contents of the storage cells to shift one position toward the output of the shift register NL*i*, thereby causing the amplitude code in the last storage cell $m \times n$ to become the output NL*i* of the shift register. This shift toward the output also causes the current amplitude level code output of threshold detector 10 to be stored in the first storage cell 1.

It is important in the operation of this echo suppression system that the shift register output during the common control time slot for a given line LO*i* is an amplitude code representing that same line. Therefore, to maintain synchronism with the common control time slots, the shift register must contain a number of storage cells which is the product of an integer *m* and the number of input lines LO*l* through LO*n*, as symbolized by the product $m \times n$. It is also important that the shift register provides a delay $\Delta T$ which is approximately equal to the round trip transmission delay time for transmissions from the near end. To achieve both synchronism and correct time delay, the integer *m* must be selected such that it is the integer portion of the quotient resulting from the division of the total delay desired from the delay device, which is determined by measuring the round trip delay time, by the time between common control time slots for the same line ($T_{sc}$).

For example, when the round trip delay time has been determined to be 210 milliseconds and the time between common control time slots for the same line is 10 milliseconds:

$m + (r/T_{sc})$ = (total delay time)/$T_{sc}$ or (210 milliseonds)/(10 milliseconds) = 21 where *m* is the integer portion of the quotient obtained by this division and *r* is the remainder.

A shift register delay device having $m \times n$ storage cells where $m$ is chosen as described above will, during the common control time slot for any given line, generate as an output the amplitude level code representing the condition of that line a period of time $\Delta T$ in the past and it will receive as an input an amplitude code from the threshold detector 10 which represents the current condition of that line. It will be remembered that this delay period $\Delta T$ is provided so that a decision to insert or remove attenuation, in response to signal transmissions from the near end, can be made at the time that the effect of a signal on the line LO*i* occurs at the point of attenuation in the line LE.

For purposes of describing the echo suppressor response to varying signal levels on a given line pair, assume that both lines LE*l* and LO*l* (FIG. 3) have been idle. Further assume that the signal level being transmitted on line LO*l* (FIG. 3) increases, resulting in a higher pcm code on line LO (FIG. 3), and that this code is sufficient to generate the maximum amplitude level code output from the LO*l* detector 10 when the next common control time slot for the line LO*l* occurs. Upon the occurrence of the next common control time slot for the line LO*l*, after the increase in the signal level on the line LO*l*, this maximum amplitude level code will be generated and stored in the first storage cell (FIG. 4) of the delay unit 13 (FIG. 3). During each common control time slot the output NL*i* of the delay unit 13, which indicates the amplitude level of the line associated with that time slot the period of time $\Delta T$ in the past, is applied to the odd threshold control 62 (FIG. 3). Also during each common control time slot the output Si of the threshold detector 12, which represents the current amplitude level of the signal on the line LE*i* associated with that time slot is applied to the signal level comparator 65. The activity status of the lines is determined on the basis of this information.

Figure 7:
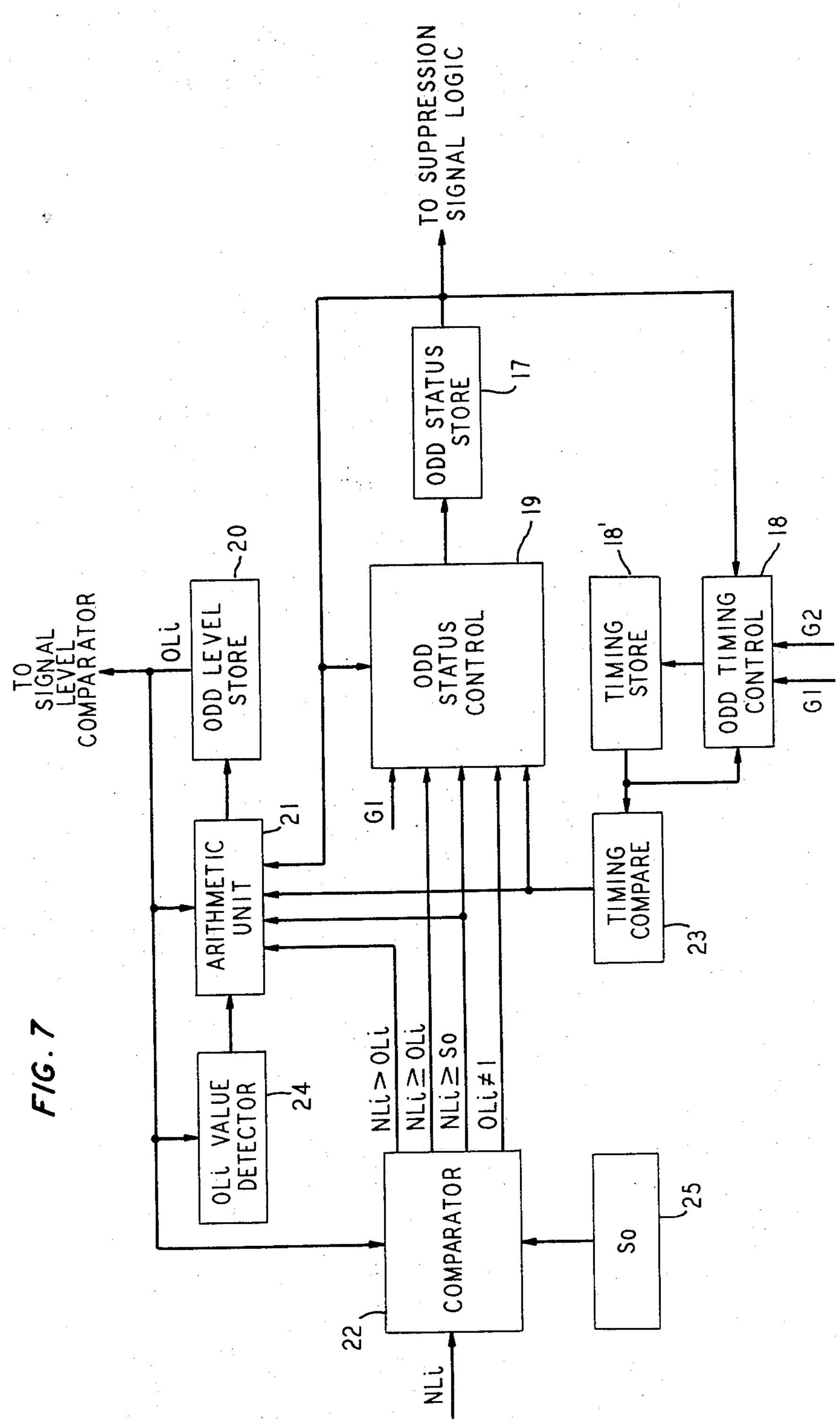
FIG. 7 provides a detailed functional block diagram of the odd threshold control shown in FIG. 3.

The method of determining if the lines of a line pair are idle is represented by the state diagrams shown in the FIGS. 5 and 6. Each of the even lines LE*l* through LE*n* has a location allocated to it in an even status store 61 (FIG. 3) and each of the odd lines LO*l* through LO*n* has a location allocated to it in an odd status store 17 (FIG. 7). The allocated location for each even line LE*l* through LE*n* contains one of the status codes shown in the FIG. 6 to indicate its current status and the allocated location for each of the odd lines LO*l* through LO*n* contains one of the status codes shown in the FIG. 5 to indicate its current status. Since in the present example both of the lines LE*l* and LO*l* have been idle, the status store locations allocated to these lines will contain the status code "00" indicating the IDLEE (FIG. 6) status and the IDLEO status (FIG. 5), respectively. The various status codes contained in these stores are changed in response to changes in the signal levels on the transmission lines to indicate the changes in status of those lines. Since in the present example the line LE*l* remains idle, no change of status will occur for this line. The control of status for the even lines will be described in greater detail herein.

The odd threshold control 62 (FIG. 3) is used to assign the activity status of the odd line LO*l* in addition to providing an odd signal level code OL*l* representing the stretched envelope of the signals on that line. A detailed block diagram of the odd threshold control 62 is shown in FIG. 7. The odd threshold control 62 (FIG. 3) determines the status code that is to be stored in the location of the odd status store 17 (FIG. 7) allocated for the line LO*l* in accordance with the conditions set forth in FIG. 5.

A more detailed understanding of the operation of the odd threshold control 62 (FIG. 3) is facilitated by referring to FIG. 7. The amplitude code output NL*i* of the delay unit 13 (FIG. 3) is applied to the comparator 22 (FIG. 7). The other inputs to the comparator 22 are an odd signal level code OL*i* from the odd level store 20 (FIG. 7) which is a time-divided store that operates in synchronism with the common control time slots and the output of the $S_o$ signal generator 25. The signal $S_o$ is the lowest level signal that can activate echo suppression. At the time the amplitude code NL*l* is generated as an indication of the past signal level on LO*l* and applied to the comparator 22, the contents of the memory location in the odd level store 20 (FIG. 7) allocated to that line and the value $S_o$ are also applied to the comparator. Since line LO*l* has been idle, its memory location in the odd level store 20, which represents the stretched envelope of signals on that line, will contain the value zero. It will be remembered that the line LO*l* has been idle and that the threshold detector 10 (FIG. 3) has just detected an increase in the amplitude of signals on the line LO*l* and stored the maximum amplitude level code in the delay unit 13. The outputs NL*i* of the delay unit 13 will continue to indicate an idle line LO*l* for the period of time $\Delta T$ since the outputs NL*i* represent the amplitude level which occurred on the line LO*l* the period of time $\Delta T$ in the past. When the amplitude code NL*l* from the delay unit 13 (FIG. 3) becomes the maximum value obtainable, from the threshold detector 10, the condition NL*l* > $S_o$ exists and the comparator 22 generates a signal indicating this condition which is applied to the odd status control 19.

The amplitude code NL*l* and $S_o$ discussed above are the same signals as those shown in FIG. 5. The signal generated by the comparator 22 (FIG.. 7) indicating that NL*l* > $S_o$ results in the odd status control 19 replacing IDLEO code "00" (FIG. 5) in the location of the odd status store 17 (FIG. 7) allocated to line LO*l* with the OT coce "ol" as the status of the line. Furthermore, the simultaneous existence of NL*l* > $S_o$ with IDLEO as the assigned status of line LO*l* results in the arithmetic unit 21 (FIG. 7) incrementing the stored level code OL*l* in the odd level store location allocated to the line by one and a line LO*l* location in the timing store 18' is cleared. The stored level code OL*l* is altered in such a manner that it represents a stretched version of the outputs NL*i* of the delay unit 13. The statistical stretching of the NL*i* signals which is described in greater detail later herein is necessary to compensate for the uncertainty and variability of the time delay in the echo path.

During the time that OT is the assigned status of line LO*l* and the delay unit 13 output NL*l* > OL*l*, the level code OL*l* stored in the odd level storage location allocated to the line LO*l* will be incremented by one every time the line's common control time slot occurs. Similarly, during the existence of the condition OT·(NL*l* > $S_0$)· Gl, where G1 is a system timing granularity pulse occurring at some submultiple of the line sampling rate, the timing code stored in the memory location of the odd timing store 18' allocated for the line LO*l* is incremented. This system employs granularity pulses G1 and G2 which occur at one-sixth and one-fourth of the rate of common control time slots, respectively. These granularity signals provide a variable timing rate which allows the use of a minimum length code word for storing the timing codes for both short and long intervals. During the OT state, the line LO*l* is processed by the odd status control 19 (FIG. 7) only when G1 occurs and this is when the line's timing code is incremented. Thus, in the situation being discussed, the stored level code OL*l* in the odd level store 20 (FIG. 7), representing the stretched version of the speech envelope at the output of the delay unit 13, is incremented every common control time slot for the line LO*l* and the LO*l* timing code in the odd timing store 18' is incremented upon each occurrence of a selected submultiple of the basic common control time slot rate of the system.

As long as the outputs NL*i* of the delay unit 13 remain high, the LO*l* timing code in the odd timing store 18' (FIG. 7) is incremented until it has been incremented to a value that results in the generation of the T1 timing signal. In essence, these operations continue as long as the delayed amplitude level approximation of the signals on the line LO*l* is greater than or equal to the level $S_O$ at which level signals on a line are capable of producing disturbing echoes. When the timing code for the line has been incremented to a selected value, the timing compare 23 (FIG. 7) generates the T1 timing signal which indicates that the OT state has been continuously assigned to the line LO*l* for a selected interval. When the delay unit output NL*l* $\geq S_O$ has existed for the period of time T1 and the condition NL*l* $\geq S_O$ continues to exist, the odd status control 19 (FIG. 7) replaces the OT status code "01" (FIG. 5) in the odd status store location allocated for the line LO*l* with the ODD status code "10" which changes the status of the line from an inactive line status to an active line status.

Each status code assigned to a given line is applied to the suppression signal logic 64 (FIG. 3) during the time slot for that line. The assignment of an active line status to the line LO*l* and the application of this status to the suppression signal logic 64 will result in the generation of the signal E (FIG. 3) which operates the switch 15 to insert attenuation into the line LE during the time slot for the line LE*l* if IDLEE is the assigned status of the line LE*l*. The insertion of the attenuator into the line LE during the LO*l* – LE*l* time slot attenuates the echo resulting from the previous transmission on the line LO*l*. The continuous existence of the OT state for the selected interval represented by the timing code T1 is an indication that the signal on the line LO*l* is, in all probability, information as opposed to noise.

On the other hand, if the signal level on line LO*l*, which presently has an OT status, drops such that, after the period of time ΔT, the delay unit output NLi $< S_O$, IDLEO will replace OT as the assigned status of the line. For this condition, the outputs NL*l* of the delay unit 13 will result in the comparator 22 (FIG. 7) generating a signal indicating that NL*l* $< S_O$ during the line LO*l* time slot which results in the odd status control 19 replacing the OT status code "01" with the IDLEO status code "00" in the location of the status store 17 allocated to that line. In essence, the status of the line is changed from the OT status to the IDLEO status on the first output of the delay unit 13 for the line LO*l* that is processed when the condition NL*l* $< S_O$ exists simultaneously with the G1 granularity pulse. This mode of operation is produced by a butst of noise on the line.

Since the high signal level on the line LO*l* has been assumed to be information rather than noise, the assigned status of the line is not changed from OT to IDLEO but is, instead, changed from OT to the ODD active line status (FIG. 5). This active status is assigned to the line when it is very probable that the signal on th line is an information bearing signal. When the assigned status of line LO*l* is ODD, (FIG. 5), the amplitude code output NL*l* of the delay unit 13 (FIG. 3), representing the delayed speech envelope of the line, is compared with the level code OL*l* which is stored in the line LO*l* location o the odd level store 20 (FIG. 7). It will be recalled that OL*l* represents a stretched version of the delayed signal envelope of the line. During the OT state this code OL*l* was incremented, during each common control time slot for the line LO*l* since in the present example the delay unit output NL*l* was greater than the stored OL*l* code during this interval.

More particularly, the stored level code OL*l* is incremented in the following manner. The amplitude code outputs NL*l* of the delay unit 13 (FIG. 3), representing the past amplitude levels on line LO*l*, are applied to the comparator 22 (FIG. 7) at the same time the store level code OL*l* is applied to the comparator 22 from the odd level store 20. Since in the present example the delay unit outputs NL*l* for the line LO*l* are extremely high, the relation NL*l* > OL*l* will exist and the comparator 22 (FIG. 7) will generate a signal indicating this condition. The signal indicating NL*l* > OL*l* is applied to the arithmetic unit 21 and results in the stored level code OL*l* being incremented by one each time the above condition exists during a time slot for the line LO*l*. Where the signal on the line is extremely high, as is assumed in this case, the stored level code OL*l* will be incremented upon each occurrence of the line's common control time slot until the code reaches some maximum allowable value. When this maximum value has been attained, the detector 24 generates a signal that inhibits any further incrementing of the stored level code OL*l*. The upper bound may be placed on the value of the stored level code OL*l* because of storage location capacity, or because once the code has reached a certain value, nothing is gained by further incrementing it even though the signal on line LO*l* is higher than the level represented by the code, or because of a combination of these reasons.

The ODD status (FIG. 5) will remain the assigned status of line LO*l* until the signal level on that line decreases to a point that the amplitude code output NL*l* of the delay unit 13 (FIG. 3) is less than the stored OL*l* level code during the common control time slot for the line LO*l*. When this occurs, the comparator 22 (FIG. 7) will not generate a signal indicating that NL*l* $\geq$ OL*l* and the absence of this condition during the ODD state results in the odd status control 19 (FIG. 7) changing the assigned status of the line LO*l* from the ODD status to the OHO hangover status (FIG. 5). This change in status is accomplished by the status control 19 (FIG. 7) replacing the "10" ODD status code in the line LO*l* location of the status store 17 with the "11" OHO hangover status code. As previously pointed out, this change in status for the line LO*l* resulting from a decreased signal level on the line provides hangover for bridging a null in the signal on the line LO*l* if it lasts less than a selected interval. The OHO status, like the ODD status, is an active line status and if echo suppression was activated during the time the ODD status was assigned to line LO$l$, it will remain activated during the interval the OHO status is assigned to the line unless the even line LE$l$ becomes active.

The hangover status OHO (FIG. 5) will remain the assigned status of the line LO$l$ until either the signal level on the line increases to the point that the delay unit output NL$l$ $\geq$ OL$l$ or the condition NL$l$ < OL$l$ has existed continuously for a selected interval. If the signal level on the line increases, resulting in the comparator 22 (FIG. 7) generating a signal indicating NL$l$ $\geq$ OL$l$, the odd status control will change the assigned status of line LO$l$ by replacing the OHO code in the line's location of the odd status store 17 with the ODD status code. After this occurs, the operations performed by the circuitry will be the same as described above when it was assumed that the line's assigned status was the ODD status.

On the other hand, if the signal level on the line LO$l$ remains at the level such that NL$l$ < OL$l$ (FIG. 5) for an interval $T_K$ and the stored level code OL$l$ $\neq$ $l$, the ODD status will replace the OHO hangover status as the assigned status of the line. This alteration of status assignment is accompanied by an initialization of the timing code associated with the line. The alteration of the status of the line is performed in the same manner as described above. Simultaneously with this change of status, the condition (NL$l$ < OL$l$)·(OL$l$ $\neq$ $l$)·$T_K$ results in the arithmetic unit 21 (FIG. 7) decrementing the level code OL$l$ stored in the line LO$l$ location of the odd level store 20. During the OHO hangover state, the odd timing unit 18 (FIG. 7) arithmetically alters a stored timing code associated with the line LO$l$ at a submultiple of the line sampling rate determined by the occurrence of the granularity signal G2 (FIG. 7). The interval represented by the $T_K$ timing code is considerably longer than the interval represented by the T1 timing code associated with the OT status. The OL$i$ value detector 24 (FIG. 7) generates a signal that OL$l$ $\neq$ $l$ and this signal, along with presence of the timing signal $T_K$ generated by the timing compare 23 and the absence of the signal NL$l$ $\geq$ OL$l$ from the comparator 22 enables the arithmetic unit 21 which decrements the level code OL$l$ stored in the location of the odd level store 20 allocated for the line. If the next amplitude code output NL$l$ of the delay unit 13 (FIG. 3) for line LO$l$, after the decrementing of OL$l$, is such that NL$l$ OL$l$, the line's assigned status will remain the ODD status. On the other hand, if the next NL$l$ is less than the decremented OL$l$, the status of line LO$l$ again changes from the ODD to the OHO hangover status. As long as the amplitude code NL$l$ remains less than the stored level code OL$l$, the stored level code OL$l$ will be decremented and the status of the line will alternate between OHO and ODD at a rate determined by the occurrence of the timing signal $T_K$ until the stored level code OL$l$ has been decremented to the value one. This mode of operation allows a desirable period of hangover without requiring an excessively large timing store 18' for the odd timing.

When the level code OL$l$ is decremented to one and an amplitude code NL$l$ < OL$l$ continues to exist, the OHO status will again be assigned as the line LO$l$ status. The assignment of OHO as the status of the line LO$l$ again results in the timing unit 18 incrementing the LO$l$ timing code stored in the odd timing store 18' (FIG. 7). As previously mentioned, when the stored timing code is incremented to a selected value, the timing compare 23 will generate the $T_K$ timing signal. At this same time the comparator 22 (FIG. 7) generates a signal indicating that the stored level code OL$l$ = $l$. These two signals are applied to the odd status control 19 which responds by replacing the OHO hangover status code "11" in the line LO$l$ location of the status store 17 with the IDLEO status code "00." In essence, the assigned status of the line LO$l$ is changed from the active hangover status OHO to the IDLEO status which is an inactive status indicating that the signal level on the line is not high enough to warrant echo suppression. This transition of the status of the line LO$l$ deactivates echo suppression.

The foregoing has shown how the odd threshold control 62 operates in accordance with the FIG. 5 to alter the status assigned to a line LO$l$ as the signal level on that line varies above and below the level at which objectionable echoes will be produced. This circuitry, shown in detail in FIG. 7, utilizes comparisons between the amplitude code NL$l$, which is the delayed representation of an approximated peak value of the signal level on the line, the fixed value $S_O$ representing a signal level capable of producing echoes, and the variable stored level code OL$l$ in determining the assigned status of the line and the magnitude of stored level code OL$l$ which represents the stretched version of the envelope on the line.

Concerning the applicants' full echo suppressor as described above, it was first shown that the outputs NL$i$ of the delay unit 13 (FIG. 3) represent the amplitude level signals which occurred on a given line the period of time $\Delta T$ in the past. It was also shown that when the amplitude code outputs NL$l$ of the delay unit 13 were sufficiently high, in response to a past signal on the line LO$l$ with a high peak amplitude, the line LO$l$ had various active status codes assigned to it as indicated in FIG. 5. These various active status codes assigned to line LO$l$, in conjunction with the idle status code assigned to line LE$l$, resulted in the attenuator 16 (FIG. 3) being inserted in series with the line LE during the LO$l$ – Le$l$ time slot. Secondly, it was shown that when the delay unit output NL$l$ dropped below a selected level, the active status assigned to the line LO$l$ was altered, as a function of time and the past signal amplitudes on that line until its assigned state was again the idle state IDLEO. When the assigned status of the line LO$l$ became the IDLEO state (FIG. 5) again, the attenuator 16 (FIG. 3) was deactivated and passed the signals on the line LE$l$ transmission path without attenuating them since echo suppression was no longer needed.

In the above discussion of the operation of the system in FIG. 3, it was assumed that line LE$l$ was idle. Therefore, its assigned status was the IDLEE state (FIG. 6). However, if the line LE$l$ becomes active, echo suppression cannot be activated during the time line LE$l$ remains active, or echo suppression must be deactivated if it has been previously activated. In other words, as previously mentioned, line LE$l$ being active means information is being transmitted on it and this information must not be blocked by the insertion of the digital attenuator 16 in its transmission path.

Referring to FIG. 3, the activity status of line LE$l$ is determined by comparing the approximated peak amplitude $S_1$ of the signal being received on it, generated in the line's time slot by the threshold detector 12 with the stored level code OL*l* for the line LO*l* which is stored in the odd threshold control 62. This comparison is carried out by the comparator 65 each time the time slot for the line pair LO*l* – LE*l* occurs. It will be remembered that the stored level code OL*l* is the stretched version of the signal level which occurred on the line LO*l* a period of time ΔT prior to the current time slot. If the signal level being transmitted on line LE*l* exceeds the stored level code OL*l* for the line LO*l*, indicating that the line LE*l* is active, the comparator 65 generates a signal AE that is applied to the LE status detector 63. A signal $\overline{AE}$ is generated by the signal level comparator whenever the signal AE is not generated.

At the same time the signal AE is applied to the LE status detector 63, the past status code, which in the present example is the IDLEE code "00" (FIG. 6), is available from the even status store 61 (FIG. 3) and this code is also applied to the LE status detector 63. The even status store 61 is a recirculating store which derecirculates the synchronism with the occurrence of common control time slots so that each time the amplitude code $S_1$ and the stored level code OL*l* appear at the outputs of the detector 12 and the odd threshold control 62, respectively, for the line pair LE*l* – LO*l*, the assigned status of the line LE*l* is available.

The concurrent existence of the signal AE and the "00" assigned status code of line LE*l* as inputs to the status detector 63 (FIG. 3) results in a new status code being stored in the location of the even status store 61 allocated for line LE*l*. Referring to FIG. 6, the condition AE·(00) is the condition resulting in the status of line LE*l* becoming DHO. Thus, the LE status detector 63 (FIG. 3) responds to the condition AE·(00) by replacing the "00" in the even status store 61 (FIG. 3) with the code "01." Consequently, the next time the common control time slot for the line pair occurs, the status of the line LE*l* will be the DHO state (FIG. 6) represented by the code "01" in the appropriate location of the even status store 61. It should be noted that the DHO state being assigned to the line LE*l* indicates that the line is active and, hence, no attenuation can be inserted into the line LE, during the LO*l* – LE*l* time slot.

The function of the DHO status (FIG. 6) is similar to that of the OT state (FIG. 5) provided for the odd line. That is, it is possible that a burst of noise was the source of codes representing high amplitudes on line LE*l*. If this is the case, it is desirable to minimize the amount of time line LE*l* is assigned an active status code. As was explained above, regarding the FIG. 5, the presence of a signal on the line LO*l* may warrant the activation of echo suppression but the active status assigned to line LE*l* prevents this activation. Thus, a burst of noise can result in line LE*l* being assigned an active status which deactivates echo suppression and allows echo signals to be transmitted on the line. By minimizing the time line LE*l* is assigned an active status as a result of noise, the amount of time echo signals are transmitted is also reduced.

If the active status DHO (FIG. 6) is assigned to line LE*l* as a result of noise, succeeding samples of the line will fail to generate the signal AE repetitively. Referring to FIG. 6, the active status DHO will be changed back to the IDLEE state if the signal amplitude being transmitted on line LE*l* drops and remains below a level sufficient to produce the signal AE during the occurrence of all the time slots for the line pair over a period represented by the timing signal T'O (FIG. 6).

Timing is accomplished by the LE timing unit 67 in FIG. 3. When the DHO state (FIG. 6) is assigned to line LE*l* (FIG. 3) as a result of the generation of the signal AE, the timing unit 67 is enabled. The timing unit 67 will arithmetically alter the contents of a timing store 67' location assigned to line Le*l* for each of the line's time slots during which the line fails to produce the signal AE. For instance, the timing store location allocated to line LE*l* may be decremented for every such occurrence of the line's time slot. When the code contained in the line LE*l* location of the timing store 67' (FIG. 3) reaches a preselected value represented by T'O (FIG. 6), indicating that the prescribed interval has passed without AE being generated again, the T'O timing signal will be applied to the LE status detector 63 (FIG. 3) by the even timing compare 23' (FIG. 3).

At the same time, the status code "01" (FIG. 6) assigned to line LE*l* will also be applied to the status detector 63. This condition, $\overline{AE}$·DHO·T'O (FIG. 6), activates the even status detector 63 resulting in the timing unit storage location assigned to line LE*l* being cleared and the assigned status code in the status store 61 being changed to "00."

In this manner, the assigned status of the line, which was changed to the active status DHO as a result of noise, becomes the IDLEE state again after the noise has subsided and the signal AE is not generated on any sample of the line LE*l* for the interval represented by T'O (FIG. 6). Again, the state diagram in FIG. 6, in essence, represents the various responses of a system whose operation is based on the amplitude statistics of the signals being transmitted on the input lines.

If the signal level on line LE*l* represents information, it will remain high enough to generate codes $S_1$ which result in the signal AE being generated by the comparator 65 during each common control time slot of the line LE*l* for an interval represented by the timing signal T'1 (FIG. 6). Referring to FIG. 3, as has been noted, during the time the DHO state (FIG. 6) is assigned to the line LE*l*, the LE timing unit 67 is activated. In the case where signal AE is being generated, the timing store 67' location allocated for the line LE*l* may be incremented during every common control time slot of the line that produces the signal AE. As the signal AE continues to be generated from time slot to time slot of the line LE*l*, the line's timing code will reach a selected value represented by the signal T'1. When this occurs, the timing compare 23' will generate the timing signal T'1 and the assigned status DHO (FIG. 6) will be available in the even status store 61. These signals are applied to the LE status detector 63 which responds to the condition DHO · AE · T'1 by clearing the location in the timing store 67' assigned to line LE*l* and changing the assigned status code in the line's allocated storage location in the even status store 61 to "10" (FIG. 6). In other words, the assigned status of line LE*l* is changed from DHO to E.

Referring to FIG. 6, the presence of the code "10" in the even status store 61 (FIG. 3) location allocated to line LE*l* indicates that the signals being transmitted on the line are in all probability information bearing signals. Consequently, the assigned state E (FIG. 6), represented by the code "10," is considered the fully active state of the line LE*l*. This will remain the assigned state of the line until the signal levels being transmitted on it drop below a level sufficient to produce the signal AE.

As mentioned above, information bearing signals fluctuate in amplitude and it is desirable to avoid interrupting the line LE*l* by activating echo suppression when a temporary null in the signals on the line occur. Such interruption can occur any time the status of the line LE*l* becomes the inactive status IDLEE. The hangover state EH (FIG. 6) is provided to avoid this problem. When the null in the signal level being transmitted on the line LE*l* is such that the signal AE (FIG. 3) is not generated by the comparator 65 during a time slot of the line pair, the assigned state of line LE*l* becomes the EH hangover state (FIG. 6). Referring to FIG. 3, the signal $\overline{AE}$ and the E state code "10" (FIG. 6), available from the even status store 61 at the time the time slot for the line LE*l* occurs, are applied to the LE status detector 63. The status detector 63 responds to the condition E · $\overline{AE}$ by replacing the "10" code in the status store 61 (FIG. 3) with the code "11." This represents the transition from the E state to the EH hangover state in FIG. 6.

If the signal amplitude being transmitted on the line LE*l* returns to a level sufficient to generate the signal AE again, before the interval represented by T'2 (FIG. 6) expires, and remains at this level for an interval represented by T'0, the assigned status of the line becomes the E state again. In other words, during the time the line LE*l* (FIG. 3) has the EH state (FIG. 6) assigned to it, the even timing unit 67 (FIG. 3) is enabled and the location of the timing store 67' allocated for the line is arithmetically altered every time the common control time slot for the line occurs. When the time slot of the line pair occurs and the timing code for a line LE*l* is a selected value, the signal T'0 is generated by the timing unit 67. This signal along with the EH code signals "11" (FIG. 6), which are available in the even status store 61 (FIG. 3), are applied to the LE state detector 63. The condition Eh·AE·T'0 (FIG. 6) results in an output from the status detector 63 which alters the "11" code in the even status store 61 location allocated for the line LE*l* to "10." That is, the assigned state of the line LE*l* is changed from the EH state back to the E state.

By providing the hangover state EH (FIG. 6), which is an active line state, it is insured that a transmission on the line LE*l* is not interrupted as a result of a temporary null in the information signal on the line activating echo suppression.

On the other hand, if the signal level on the line LE*l* drops, and remains at a level insufficient to generate the signal AE (FIG. 3) for an interval represented by a timing signal T'2 (FIG. 6), the IDLEE state replaces the EH state as the assigned state of the line. As indicated above, the timing unit 67 (FIG. 3) is activated during the EH state. The storage location of the timing store 67 ' allocated for line LE*l* will be arithmetically altered for each time slot of the line occurring simultaneously with the granularity pulse G2 for which no AE signal is generated. This will continue until the line LE*l* timing code in the timing store 67' (FIG. 3) reaches a selected value representing the expriation of a selected interval. When this value is reached, the timing unit 67 (FIG. 3) will generate the signal T'2 (FIG. 6). This timing signal is applied to the status detector 63 (FIG. 3). At the same time, the EH state code "11" (FIG. 6) for the line is available from the even status store 61 (FIG. 3) and it is also applied to the $\overline{LE}$ status detector 63.

The combination of signals EH·$\overline{AE}$·T'2 (FIG. 6) results in the status detector 63 generating signals which replace the "11" code in the even status store 61 (FIG. 3) location assigned to line LE*l* with the "00" code. As indicated above, this results in the assigned status of the line LE*l* being changed from the active hangover state EH (FIG. 6) to the idle state IDLEE. In other words, the transmitted signal level on line LE*l* remaining below a level sufficient to produce the signal AE for an interval represented by T'2 is used as an indication that information is no longer being transmitted on the line. Consequently, the IDLEE state (FIG. 6) is assigned to the line indicating that the line is idle. This condition allows the activation of echo suppression, via the suppression signal logic 64 (FIG. 3), if the signal level on the line LO*l* has resulted in its being assigned an active line status.

The above discussion has shown how the system in FIG. 3 operates as a full echo suppressor in accordance with the state diagrams shown in FIGS. 5 and 6 to provide suppression for echoes occurring at the near end on the line LE*l* in response to signal transmissions from the near end on the line LO*l*. The peak signal levels of the signals being transmitted on the line pair LO*l* – LE*l* are approximated by the common time-shared threshold detectors 10 and 12 (FIG. 3). Amplitude code signals representing the approximated peak signal levels carried on each line of the LE*l* – LO*l* line pair are repetitively generated by the threshold detectors 10 and 12 in the common control time slot for the line pair LE*l* – LO*l*. The amplitude code signals derived from threshold detector 10, based on the approximated peak signal level on the line LO*l*, are applied to the delay unit 13 (FIG. 3). During each common control time slot for the line pair LO*l* – LE*l* the amplitude code signals NL*l* representing the signal level which occurred on the line LO*l* the period of time ΔT prior to the current time slot are applied to the comparator 22 (FIG. 7). These amplitude codes are compared with the stored codes $S_o$ or OL*l* which represent the minimum level at which siglans on a line are capable of producing echoes and a stretched version of the past envelope on the line LO*l*, respectively. The results of the comparisons are used to alter the level code OL*l* as a function of the changing delay unit outputs NL*l* which represent the signals occurring on line LO*l* the period of time ΔT prior to the current time slot. Furthermore, the odd status control 19 (FIG. 7) in the odd threshold control 62 (FIG. 3) combines these amplitude code signals with code signals from the odd status store 17 (FIG. 7), representing the line's past assigned status, and in some cases, timing signals generated by the LO timing control 18 (FIG. 7) and granularity signals occurring at some submultiple of the occurrence of common control time slots for the line pair. The odd status control 19 responds to these signals according to the state diagram shown in FIG. 5, changing the assigned status of the line LO*l* stored in an allocated location of the odd status store 17 as indicated.

Simultaneously, the amplitude code signals derived from the threshold detector 12 (FIG. 3), based on the approximated peak signal levels on the line LE*l*, and the OL*l* code stored in the odd level store 20 (FIG. 7) which represents a stretched version of the past signal envelope of line LO*l*, are applied to a comparator 65

(FIG. 3) which generates a signal AE if the signal level on the line LE*l* is greater than that represented by the stored code OL*l* associated with line LO*l*. The signals AE and $\overline{AE}$ are used to indicate that either information is being transmitted on line LE*l* or the line is idle, respectively. These signals along with the assigned status code of the line LE*l* which is available from the even status store 61 (FIG. 3) in the time slot for the LE*l* – LO*l* line pair and, in some cases, timing signals generated by the even timing unit 67 (FIG. 3) are applied to the LE status detector 63. The status detector 63 responds to the signals according to the state diagram shown in FIG. 6, changing the line LE*l* status code contained in an allocated location of the even status store 61 accordingly.

One additional operation occurs simultaneously with those discussed above. As was mentioned, when the time slot for the LE*l* – LO*l* line pair occurs, the status code of each line is available in its respective status store. These codes, in addition to being applied to their respective status controls, are also applied to the suppression signal logic 64 (FIG. 3). If the assigned status of the line LE*l* is an idle status and the assigned status of the line LO*l* is an active status, the conditions for activating echo suppression are satisfied and a signal E is generated. It will be remembered that the status of the line LO*l* is assigned on the basis of signal levels which occurred the period of time ΔT prior to the current time slot.

The signal E generated by the suppression signal logic 64 is applied to a switch 15 which operates in response to this signal to insert the attenuator 16 in series with the line LE during the time slot for the line LE*l*. Conversely, if the assigned status code on the line LE*l* is an active status, no signal E will be generated and the switch 15 will not insert tha attenuator into the line LE. Similarly, the lineLO*l* being idle also results in the signal E not being generated. In other words, the line LE*l* having an active status assigned to it, or the line LO*l* having the idle state assigned to it, results in echo suppression being deactivated.

The following discussion describes the operation of the applicants' full echo suppressor to suppress echoes resulting from transmissions from the distant end. As previously stated, the suppression of echoes resulting from information being transmitted from the distant end is controlled in substantially the same manner as the echo suppression is controlled for transmissions from the near end. The only basic difference is that no delay period, equivalent to the delay period provided by the delay unit 13, is provided for the outputs of any threshold detector since the delay time between the detection of a transmission and the point of attenuation is so short that it is unnecessary. To control the suppression of echoes resulting from distant end transmissions, threshold detectors 9 and 11 generate amplitude codes representing the signal levels on the lines LO*l* and LE*l*, respectively, during each LO*l* – LE*l* line pair time slot. The amplitude codes generated by the threshold detector 11 are applied directly to the even threshold control 68. The even threshold control 68 is identical in construction to the previously discussed odd threshold control 62 (FIG. 3). The even threshold control 68 operates in the manner previously described, with regard to the FIG. 5, for the odd threshold control 62. When operating in this manner, the even threshold control 68 on the basis of the amplitude codes representing the line LE*l* generates a signal indicating the current status of the line LE*l* which is communicated to the suppression signal logic 64. The even threshold control 68 (FIG. 3) also generates the signal EL*l*, which represents the stretched version of the amplitude codes generated by the threshold detector 11. This stretched amplitude code is generated in the same manner that the stretched amplitude code OL*i* was generated by the odd threshold control 62.

The amplitude code generated by the digital threshold detector 9, which represents the signal level occurring on the line LO*l* is transmitted to a signal level comparator 69 during the time slot for this line. The signal level comparator 69 responds to the amplitude code representing the line LO*l* and the stretched version EL*l* of the amplitude code representing the line LE*l* to generate a signal AO when the signal amplitude on line LO*l* exceeds the stretched signal envelope EL*l*. The odd status control 70 responds to the signal AO in the same manner that the even status control 72 responds to the signal AE from the signal level comparator 65. Briefly summarized, this response consists of controlling the status assigned to the line LO*l* and communicating that status to the suppression signal logic 64.

The suppression signal logic responds to the status assigned to the line LE*l* by the even threshold control 68 and the status assigned to the line LO*l* by the odd status control 70 to generate a signal O when the line LE*l* has an active status and the line LO*l* has an inactive status. A switch 2 operates in response to the signal O to insert a digital attenuator 7 into the line LO during the time slot for the LO*l* – LE*l* line pair.

The foregoing has shown how common time-shared digital circuitry may be used to provide full echo suppression in a multiplexed transmission system. Echo suppression is provided to attenuate echoes resulting from transmissions from the near end when a near end receive line LE*i* is determined to be currently idle and an associated near end transmit line LO*i* is determined to have been active a period of time, approximately equal to the system round trip delay time, in the past. Echo suppression is provided to attenuate echoes resulting from signal transmissions from the distant end when a near end transmit line LO*i* is determined to be currently idle and a near end receive line LE*i* is determined to be currently active.

While the foregoing has dealt, in detail, with only one line pair and the system operation during the time slots for this pair, it is obvious that the system operation is the same for each of a plurality of line pairs during their respective time slots. Discussing a single line pair fully discloses applicants' method and the operation of the system utilized to perform the method, while eliminating the redundancy inherent in a discussion involving a plurality of line pairs. Additionally, it is clear that the system stores, shown as separate entities, could just as well be a single storage unit. Separate stores were used in the illustrative embodiment merely to facilitate describing the system's operation.

Clearly, upon reading the foregoing disclosure, numerous other applications and adaptations, all within the scope and spirit of the invention, will become apparent to one skilled in the art.

What is claimed is:

1. In combination;

means for generating a first digital amplitude code approximating the peak signal amplitude on a first line;

storage means for storing said first digital amplitude code;

means for generating a second digital amplitude code approximating the peak signal amplitude on a second line a selected period of time after the generation of said first digital amplitude code;

means for transmitting said first digital amplitude code from said storage means said selected period of time after the generation of said first digital code; and control means responsive to said first digital amplitude code from said storage means and said second digital amplitude code for controlling echo suppression.

2. The combination of the claim 1 wherein said control means generates an echo suppression enable signal when said second digital amplitude code indicates that said second line is idle and said stored first digital code indicates that said first line was active said selected interval of time prior to the generation of said second digital code.

3. A digital echo suppressor in a two-way transmission system comprising;

a means, located at a near end of said two-way transmission system, for generating a first digital amplitude code approximating the peak signal amplitude occurring on a transmit line of said two-way transmission system during a first time slot;

storage means for storing said first digital code;

a means, located at said near end, for generating a second digital amplitude code approximating the peak signal amplitude on a receive line of said two-way transmission system during a second time slot occurring a selected period of time after said first time slot;

means for transmitting said first digital amplitude code from said storage means during said second time slot; and means for inserting attenuation into said receive line when said second digital code indicates that said receive line is idle during said second time slot and said first digital code indicates that said transmit line was active during said first time slot.

4. The digital echo suppressor of the claim 3 wherein said second time slot occurs at approximately the round trip delay time of said two-way transmission system after said first time slot.

5. A digital echo suppressor in a two-way transmission system comprising;

a first threshold detector for translating the signal level occurring on a transmit line of said two-way transmission system during a first time slot into a first digital code approximating the peak signal amplitude on said transmit line;

means for storing said first digital code;

means for transmitting said first digital code from said storage means during a second time slot occurring approximately the round trip delay time of said two-way transmission system after said first time slot;

a second threshold detector for translating the signal level occurring on a receive line of said two-way transmission system during said second time slot into a digital code approximating the peak signal amplitude on said receive line;

means for generating an echo suppressor activation signal when the stored first code indicates that said transmit line was active during said first time slot and said second digital code indicates that said receive line is idle during said second time slot; and means responsive to said echo suppressor activation signal for inserting attenuation into said receive line.

* * * * *